US009584964B2

(12) United States Patent
Pelkey (10) Patent No.: US 9,584,964 B2
(45) Date of Patent: Feb. 28, 2017

(54) ENFORCEMENT OF PROXIMITY BASED POLICIES (71) Applicant: AirWatch LLC, Atlanta, GA (US)

(72) Inventor: Joshua Grey Pelkey, Mount Pleasant, SC (US)

(73) Assignee: AirWatch LLC, Atlanta, GA (US)

( * ) Notice: Subject to any disclaimer, the term of this patent is extended or adjusted under 35 U.S.C. 154(b) by 0 days.

(21) Appl. No.: 14/579,314

(22) Filed: Dec. 22, 2014

(65) Prior Publication Data
US 2016/0183164 A1   Jun. 23, 2016

(51) Int. Cl.
*H04M 3/16* (2006.01)
*H04W 4/02* (2009.01)
*H04W 4/00* (2009.01)
*H04W 12/00* (2009.01)
*H04L 29/06* (2006.01)
*H04W 12/06* (2009.01)
*H04W 12/08* (2009.01)

(52) U.S. Cl.
CPC ............. *H04W 4/02* (2013.01); *H04L 63/107* (2013.01); *H04W 4/008* (2013.01); *H04W 12/00* (2013.01); *H04W 12/06* (2013.01); *H04W 12/08* (2013.01)

(58) Field of Classification Search
CPC ......... H04W 4/02; H04W 4/008; H04W 4/18; H04W 4/021; H04W 4/023; H04W 4/04; H04W 4/20; H04W 12/18; H04W 12/12; H04W 24/00; H04W 4/001
USPC .......... 455/414.1, 411, 417, 420, 419, 422.1, 455/404.1, 404.2, 456.1, 456.2, 456.3
See application file for complete search history.

(56) References Cited

U.S. PATENT DOCUMENTS

| 5,574,786 | A |   | 11/1996 | Dayan et al. |
| 5,987,609 | A |   | 11/1999 | Hasebe |
| 6,021,492 | A |   | 2/2000 | May |
| 6,023,708 | A |   | 2/2000 | Mendez et al. |
| 6,078,260 | A | * | 6/2000 | Desch ............. G08B 21/023 340/539.1 |
| 6,085,192 | A |   | 7/2000 | Mendez et al. |
| 6,131,096 | A |   | 10/2000 | Ng et al. |
| 6,131,116 | A |   | 10/2000 | Riggins et al. |
| 6,151,606 | A |   | 11/2000 | Mendez |

(Continued)

FOREIGN PATENT DOCUMENTS

CA   2149337   6/1994
EP   2675137   12/2013

(Continued)

OTHER PUBLICATIONS

Office Action mailed Aug. 6, 2015 in U.S. Appl. No. 13/828,922, filed Mar. 14, 2013.

(Continued)

*Primary Examiner* — Jean Gelin (57) ABSTRACT

Embodiments of the disclosure are related to enforcing a policy on a computing device, or a companion device, based upon its proximity to another computing device, or an anchor device. In one example, the anchor device and companion device can report their location with respect to one another to a policy server. The policy server can determine whether the anchor device and proximity device are in proximity to one another as well as determine whether a policy should be applied to the companion device based upon whether it is in proximity to the anchor device.

21 Claims, 9 Drawing Sheets

(56) References Cited

U.S. PATENT DOCUMENTS

| | | | |
|---|---|---|---|
| 6,233,341 B1 | 5/2001 | Riggins | |
| 6,560,772 B1 | 5/2003 | Slinger | |
| 6,708,221 B1 | 3/2004 | Mendez et al. | |
| 6,714,859 B2 | 3/2004 | Jones | |
| 6,726,106 B1 | 4/2004 | Han et al. | |
| 6,727,856 B1 | 4/2004 | Hill | |
| 6,741,232 B1 | 5/2004 | Siedlikowski et al. | |
| 6,741,927 B2 | 5/2004 | Jones | |
| 6,766,454 B1 | 7/2004 | Riggins | |
| 6,779,118 B1 | 8/2004 | Ikudome et al. | |
| 6,904,359 B2 | 6/2005 | Jones | |
| 6,965,876 B2 | 11/2005 | Dabbiere | |
| 6,995,749 B2 | 2/2006 | Friend | |
| 7,032,181 B1 | 4/2006 | Farcasiu | |
| 7,039,394 B2 | 5/2006 | Bhaskaran | |
| 7,039,679 B2 | 5/2006 | Mendez et al. | |
| 7,064,688 B2 | 6/2006 | Collins et al. | |
| 7,092,943 B2 | 8/2006 | Roese et al. | |
| 7,184,801 B2 | 2/2007 | Farcasiu | |
| 7,191,058 B2 | 3/2007 | Laird et al. | |
| 7,203,959 B2 | 4/2007 | Nachenberg et al. | |
| 7,225,231 B2 | 5/2007 | Mendez et al. | |
| 7,228,383 B2 | 6/2007 | Friedman et al. | |
| 7,275,073 B2 | 9/2007 | Ganji et al. | |
| 7,284,045 B1 | 10/2007 | Marl et al. | |
| 7,287,271 B1 | 10/2007 | Riggins | |
| 7,308,703 B2 | 12/2007 | Wright et al. | |
| 7,310,535 B1 | 12/2007 | MacKenzie et al. | |
| 7,353,533 B2 | 4/2008 | Wright et al. | |
| 7,363,349 B2 | 4/2008 | Friedman et al. | |
| 7,363,361 B2 | 4/2008 | Tewari et al. | |
| 7,373,517 B1 | 5/2008 | Riggins | |
| 7,430,757 B1 | 9/2008 | Chari et al. | |
| 7,437,752 B2 | 10/2008 | Heard et al. | |
| 7,444,375 B2 | 10/2008 | McConnell et al. | |
| 7,447,506 B1 | 11/2008 | MacKenzie et al. | |
| 7,447,799 B2 | 11/2008 | Kushner | |
| 7,475,152 B2 | 1/2009 | Chan et al. | |
| 7,496,957 B2 | 2/2009 | Howard et al. | |
| 7,539,665 B2 | 5/2009 | Mendez | |
| 7,543,146 B1 | 6/2009 | Karandikar et al. | |
| 7,565,314 B2 | 7/2009 | Borgeson et al. | |
| 7,590,403 B1 | 9/2009 | House et al. | |
| 7,594,224 B2 | 9/2009 | Patrick et al. | |
| 7,603,547 B2 | 10/2009 | Patrick et al. | |
| 7,603,548 B2 | 10/2009 | Patrick et al. | |
| 7,603,703 B2 | 10/2009 | Craft et al. | |
| 7,617,222 B2 | 11/2009 | Coulthard et al. | |
| 7,620,001 B2 | 11/2009 | Ganji | |
| 7,620,392 B1 | 11/2009 | Maurya et al. | |
| 7,650,491 B2 | 1/2010 | Craft et al. | |
| 7,660,902 B2 | 2/2010 | Graham et al. | |
| 7,665,118 B2 | 2/2010 | Mann et al. | |
| 7,665,125 B2 | 2/2010 | Heard et al. | |
| 7,685,645 B2 | 3/2010 | Doyle et al. | |
| 7,702,322 B1 | 4/2010 | Maurya et al. | |
| 7,702,785 B2 | 4/2010 | Bruton, III et al. | |
| 7,735,122 B1 | 6/2010 | Johnson et al. | |
| 7,739,334 B1 | 6/2010 | Ng et al. | |
| 7,752,166 B2 | 7/2010 | Quinlan et al. | |
| 7,769,394 B1 | 8/2010 | Zhu | |
| 7,788,382 B1 | 8/2010 | Jones et al. | |
| 7,792,297 B1 | 9/2010 | Piccionelli et al. | |
| 7,840,631 B2 | 11/2010 | Farcasiu | |
| 7,890,091 B2 | 2/2011 | Puskoor et al. | |
| 7,912,896 B2 | 3/2011 | Wolovitz et al. | |
| 7,917,641 B2 | 3/2011 | Crampton | |
| 7,970,386 B2 | 6/2011 | Bhat et al. | |
| 7,991,697 B2 | 8/2011 | Fransdonk | |
| 8,001,082 B1 | 8/2011 | Muratov | |
| 8,012,219 B2 | 9/2011 | Mendez et al. | |
| 8,041,776 B2 | 10/2011 | Friedman et al. | |
| 8,046,823 B1 | 10/2011 | Begen et al. | |
| 8,060,074 B2 | 11/2011 | Danford et al. | |
| 8,069,144 B2 | 11/2011 | Quinlan et al. | |
| 8,078,157 B2 | 12/2011 | Maurya et al. | |
| 8,094,591 B1 | 1/2012 | Hunter et al. | |
| 8,108,687 B2 | 1/2012 | Ellis et al. | |
| 8,117,344 B2 | 2/2012 | Mendez et al. | |
| 8,150,431 B2 | 4/2012 | Wolovitz et al. | |
| 8,214,862 B1 | 7/2012 | Lee et al. | |
| 8,225,381 B2 | 7/2012 | Lemke | |
| 8,456,293 B1 * | 6/2013 | Trundle | G08B 21/0423 340/517 |
| 2002/0013721 A1 | 1/2002 | Dabbiere et al. | |
| 2002/0049580 A1 | 4/2002 | Kutaragi et al. | |
| 2002/0157019 A1 | 10/2002 | Kadyk et al. | |
| 2003/0020623 A1 | 1/2003 | Cao et al. | |
| 2003/0065950 A1 | 4/2003 | Yarborough | |
| 2003/0110084 A1 | 6/2003 | Eberhard et al. | |
| 2003/0164853 A1 | 9/2003 | Zhu et al. | |
| 2003/0204716 A1 | 10/2003 | Rockwood et al. | |
| 2004/0123153 A1 | 6/2004 | Wright et al. | |
| 2004/0181687 A1 | 9/2004 | Nachenberg et al. | |
| 2004/0224703 A1 | 11/2004 | Takaki et al. | |
| 2005/0097032 A1 | 5/2005 | Benco et al. | |
| 2005/0097327 A1 | 5/2005 | Ondet et al. | |
| 2005/0181808 A1 | 8/2005 | Vaudreuil | |
| 2005/0246192 A1 | 11/2005 | Jauffred et al. | |
| 2006/0013566 A1 | 1/2006 | Nakamura | |
| 2006/0067250 A1 | 3/2006 | Boyer et al. | |
| 2006/0190984 A1 | 8/2006 | Heard et al. | |
| 2007/0033397 A1 | 2/2007 | Phillips, II et al. | |
| 2007/0130473 A1 | 6/2007 | Mazotas | |
| 2007/0136492 A1 | 6/2007 | Blum et al. | |
| 2007/0156897 A1 | 7/2007 | Lim | |
| 2007/0162417 A1 | 7/2007 | Cozianu et al. | |
| 2007/0174433 A1 | 7/2007 | Mendez et al. | |
| 2007/0261099 A1 | 11/2007 | Broussard et al. | |
| 2007/0288637 A1 | 12/2007 | Layton et al. | |
| 2008/0010689 A1 | 1/2008 | Ooi et al. | |
| 2008/0065727 A1 | 3/2008 | Majors et al. | |
| 2008/0070593 A1 | 3/2008 | Altman et al. | |
| 2008/0133712 A1 | 6/2008 | Friedman et al. | |
| 2008/0134305 A1 | 6/2008 | Hinton et al. | |
| 2008/0134347 A1 | 6/2008 | Goyal et al. | |
| 2008/0160984 A1 | 7/2008 | Benes et al. | |
| 2008/0201453 A1 | 8/2008 | Assenmacher | |
| 2008/0301057 A1 | 12/2008 | Oren | |
| 2008/0307219 A1 | 12/2008 | Karandikar | |
| 2008/0318548 A1 | 12/2008 | Bravo et al. | |
| 2009/0036111 A1 | 2/2009 | Danford et al. | |
| 2009/0089565 A1 | 4/2009 | Buchanan et al. | |
| 2009/0144632 A1 | 6/2009 | Mendez | |
| 2009/0186633 A1 | 7/2009 | Yonker et al. | |
| 2009/0198997 A1 | 8/2009 | Yeap et al. | |
| 2009/0203375 A1 | 8/2009 | Gisby et al. | |
| 2009/0260064 A1 | 10/2009 | McDowell et al. | |
| 2009/0298514 A1 | 12/2009 | Ullah | |
| 2009/0300739 A1 | 12/2009 | Nice et al. | |
| 2009/0307362 A1 | 12/2009 | Mendez et al. | |
| 2010/0005125 A1 | 1/2010 | Mendez et al. | |
| 2010/0005157 A1 | 1/2010 | Mendez et al. | |
| 2010/0005195 A1 | 1/2010 | Mendez et al. | |
| 2010/0023630 A1 | 1/2010 | Mendez et al. | |
| 2010/0083359 A1 | 4/2010 | Readshaw et al. | |
| 2010/0091711 A1 | 4/2010 | Sawai | |
| 2010/0100641 A1 | 4/2010 | Quinlan et al. | |
| 2010/0100972 A1 | 4/2010 | Lemieux et al. | |
| 2010/0120450 A1 | 5/2010 | Herz | |
| 2010/0131527 A1 | 5/2010 | Wohlert | |
| 2010/0131844 A1 | 5/2010 | Wohlert | |
| 2010/0138667 A1 | 6/2010 | Adams et al. | |
| 2010/0144323 A1 | 6/2010 | Collins et al. | |
| 2010/0146269 A1 | 6/2010 | Baskaran | |
| 2010/0222645 A1 * | 9/2010 | Nadler | A61B 5/1112 600/300 |
| 2010/0254410 A1 | 10/2010 | Collins | |
| 2010/0268844 A1 | 10/2010 | Quinlan et al. | |
| 2010/0273456 A1 | 10/2010 | Wolovitz et al. | |
| 2010/0299152 A1 | 11/2010 | Batchu et al. | |
| 2010/0299362 A1 | 11/2010 | Osmond | |
| 2010/0299376 A1 | 11/2010 | Batchu et al. | |
| 2010/0299719 A1 | 11/2010 | Burks et al. | |

(56) References Cited

U.S. PATENT DOCUMENTS

| | | |
|---|---|---|
| 2010/0317371 A1 | 12/2010 | Westerinen et al. |
| 2010/0318701 A1 | 12/2010 | Srinivasan et al. |
| 2011/0004941 A1 | 1/2011 | Mendez et al. |
| 2011/0039506 A1 | 2/2011 | Lindahl et al. |
| 2011/0082900 A1 | 4/2011 | Nagpal et al. |
| 2011/0113062 A1 | 5/2011 | Quinlan et al. |
| 2011/0113094 A1 | 5/2011 | Chunilal |
| 2011/0135083 A1 | 6/2011 | Lingafelt et al. |
| 2011/0141276 A1 | 6/2011 | Borghei |
| 2011/0145932 A1 | 6/2011 | Nerger et al. |
| 2011/0153779 A1 | 6/2011 | Mendez et al. |
| 2011/0153799 A1 | 6/2011 | Ito |
| 2011/0167474 A1 | 7/2011 | Sinha et al. |
| 2011/0202589 A1 | 8/2011 | Piernot et al. |
| 2011/0225252 A1 | 9/2011 | Bhat et al. |
| 2011/0270799 A1 | 11/2011 | Muratov |
| 2011/0276805 A1 | 11/2011 | Nagpal et al. |
| 2011/0296186 A1 | 12/2011 | Wong et al. |
| 2011/0320552 A1 | 12/2011 | Friedman et al. |
| 2012/0005578 A1 | 1/2012 | Hawkins |
| 2012/0015644 A1 | 1/2012 | Danford et al. |
| 2012/0054385 A1 | 3/2012 | Lim et al. |
| 2012/0094639 A1 | 4/2012 | Carlson et al. |
| 2012/0102392 A1 | 4/2012 | Reesman et al. |
| 2012/0190386 A1 | 7/2012 | Anderson |
| 2012/0198547 A1 | 8/2012 | Fredette et al. |
| 2012/0272287 A1 | 10/2012 | Kuhlke et al. |
| 2012/0288091 A1 | 11/2012 | Honke et al. |
| 2012/0289153 A1 | 11/2012 | Dobyns |
| 2012/0311329 A1 | 12/2012 | Medina et al. |
| 2012/0311686 A1 | 12/2012 | Medina et al. |
| 2013/0007245 A1 | 1/2013 | Malik et al. |
| 2013/0040604 A1 | 2/2013 | Sprigg et al. |
| 2013/0040629 A1 | 2/2013 | Sprigg et al. |
| 2013/0055363 A1 | 2/2013 | Dattagupta et al. |
| 2013/0061307 A1 | 3/2013 | Livne |
| 2013/0132854 A1 | 5/2013 | Raleigh et al. |
| 2013/0152169 A1 | 6/2013 | Stuntebeck |
| 2013/0165232 A1 | 6/2013 | Nelson et al. |
| 2013/0174223 A1 | 7/2013 | Dykeman et al. |
| 2013/0244614 A1 | 9/2013 | Santamaria et al. |
| 2014/0013420 A1 | 1/2014 | Picionielli et al. |
| 2014/0025256 A1 | 1/2014 | Armitage et al. |
| 2014/0066098 A1 | 3/2014 | Stern et al. |
| 2014/0068717 A1 | 3/2014 | Mayes et al. |
| 2014/0082501 A1* | 3/2014 | Bae .................. H04M 1/72569 715/728 |
| 2014/0096180 A1* | 4/2014 | Negi .................. H04L 63/0492 726/1 |
| 2014/0143852 A1 | 5/2014 | Cottrell et al. |
| 2014/0177495 A1 | 6/2014 | Mallikarjunan et al. |
| 2014/0214668 A1* | 7/2014 | Lotter .................. H04L 63/20 705/41 |
| 2014/0258481 A1 | 9/2014 | Lundell |
| 2015/0207795 A1* | 7/2015 | Wentz .................. H04L 9/12 726/4 |

FOREIGN PATENT DOCUMENTS

| | | |
|---|---|---|
| GB | 2346716 | 8/2000 |
| GB | 2361558 | 10/2001 |
| JP | 2007304009 | 11/2007 |
| JP | 2011234084 | 11/2011 |
| WO | WO9600485 | 1/1996 |
| WO | WO0003316 | 1/2000 |
| WO | WO0241661 | 5/2002 |
| WO | WO2010052669 A1 | 5/2010 |
| WO | WO2013109040 | 7/2013 |

OTHER PUBLICATIONS

Office Action mailed Jul. 16, 2015 in U.S. Appl. No. 13/875,426, filed May 2, 2013.

Office Action mailed Jul. 9, 2015 in U.S. Appl. No. 13/841,853, filed Mar. 15, 2013.

Non-Fnal Office Action for U.S. Appl. No. 13/828,922 mailed Mar. 13, 2015.

International Search Report for PCT/US2014/025256 mailed Jul. 3, 2014.

Non-Final Office Action cited in U.S. Appl. No. 13/316,073 dated Jan. 18, 2013.

Asynchrony Software, Inc., , "PDA Defense User Guide", 726, 2002.

Belani, Eshwar et al., "The CRISIS Wide Area Security Architecture", 726, 1998.

Benaloh, Josh et al., "Patient Controlled Encryption: Ensuring Privacy of Electronic Medical Records", 726, Nov. 13, 2009.

Fox, Armando et al., "Security on the Move: Indirect Authentication Using Kerberos", 726, 1996.

Menaria, Pankaj et al., "Security in Mobile Database Systems", 707, 726,Mar. 17, 2011.

Pfitzmann, Andreas et al., "Mobile User Devices and Security Modules: Design for Trustworthiness", 726, Feb. 5, 1996.

Steiner, Jennifer , "Kerberos: An Authentication Service for Open Network Systems", 726, Jan. 12, 1988.

Strunk, John et al., "Self-Securing Storage: Protecting Data in Compromised Systems", Symposium on Operating Systems Design and Implementation, 726, 2000.

Non-final Office Action cited in U.S. Appl. No. 13/841,853 mailed Jan. 28, 2015.

Final Office Action cited in U.S. Appl. No. 13/863,154 mailed Feb. 13, 2015.

Office Action mailed Dec. 24, 2015, for U.S. Appl. No. 13/828,922.
Office Action mailed Nov. 30, 2015, for U.S. Appl. No. 13/841,853.
International Search report mailed Apr. 11, 2016 for Application No. PCY/US2015/066891.
Office Action mailed Aug. 12, 2016 for U.S. Appl. No. 13/863,154.
Office Action mailed Dec. 15, 2016 for U.S. Appl. No. 13/841,853.
Office Action mailed Dec. 21, 2016 for U.S. Appl. No. 15/220,331.

* cited by examiner

ENFORCEMENT OF PROXIMITY BASED POLICIES

BACKGROUND

Computing devices, such as smartphones, laptop computers, etc., can be equipped with various functionalities and capabilities. For example, applications can be installed upon a computing device, such as a game application, enterprise application, or other type of software application. Computing devices may also be equipped with one or more network interfaces that facilitate communication with other computing devices via a network.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure is directed to enforcing proximity based policies on computing devices such as smartphones, laptop computers, desktop computers, wearable computing devices, or any other computing device. A proximity based policy, in the context of the present disclosure, comprises a policy whereby proximity to a certain geographic location or proximity to a particular computing device is required in order for certain functionality to be enabled in a computing device. In other words, a companion device or a slave device can be required to be in proximity to an anchor device or master device in order for certain functionality to be enabled on the companion device. In some embodiments, proximity, or lack thereof, to a companion device can also trigger the selection of a device management policy that can be imposed on or selected on behalf of the companion device.

An example of a scenario in which such a policy can be employed is the case of a parent wishing to facilitate the monitoring or metering of usage of a device by a child. For example, a parent may wish to impose a policy in which a device associated with the child is able to use a browser application only when the device associated with the child is in proximity to another device that is associated with the parent. In such a scenario, the parent's device can be designated as an anchor device and the child's device can be designated as a companion device. In order for a particular functionality to be enabled within the companion device, embodiments of the disclosure can require proximity of the companion device to the anchor device. Proximity can be determined by a policy server that receives location indications from the anchor device and the companion device.

Such location indications can comprise geolocation data obtained from a positioning system associated with the respective devices. Such location indications can also include an indication of whether a particular device has received an acknowledgement or ping directly from the other device using a localized communication interface or a network connection. For example, a localized communication interface can comprise a Bluetooth capability, a near-field communication (NFC) interface, a radio-frequency identification (RFID) read or write capability, or any other localized communication interface as can be appreciated. If the devices are out of communication range via the localized communication interface, one or both of the anchor device or companion device can communicate a location indication the policy server that the devices are no longer in proximity to one another.

Figure 1:
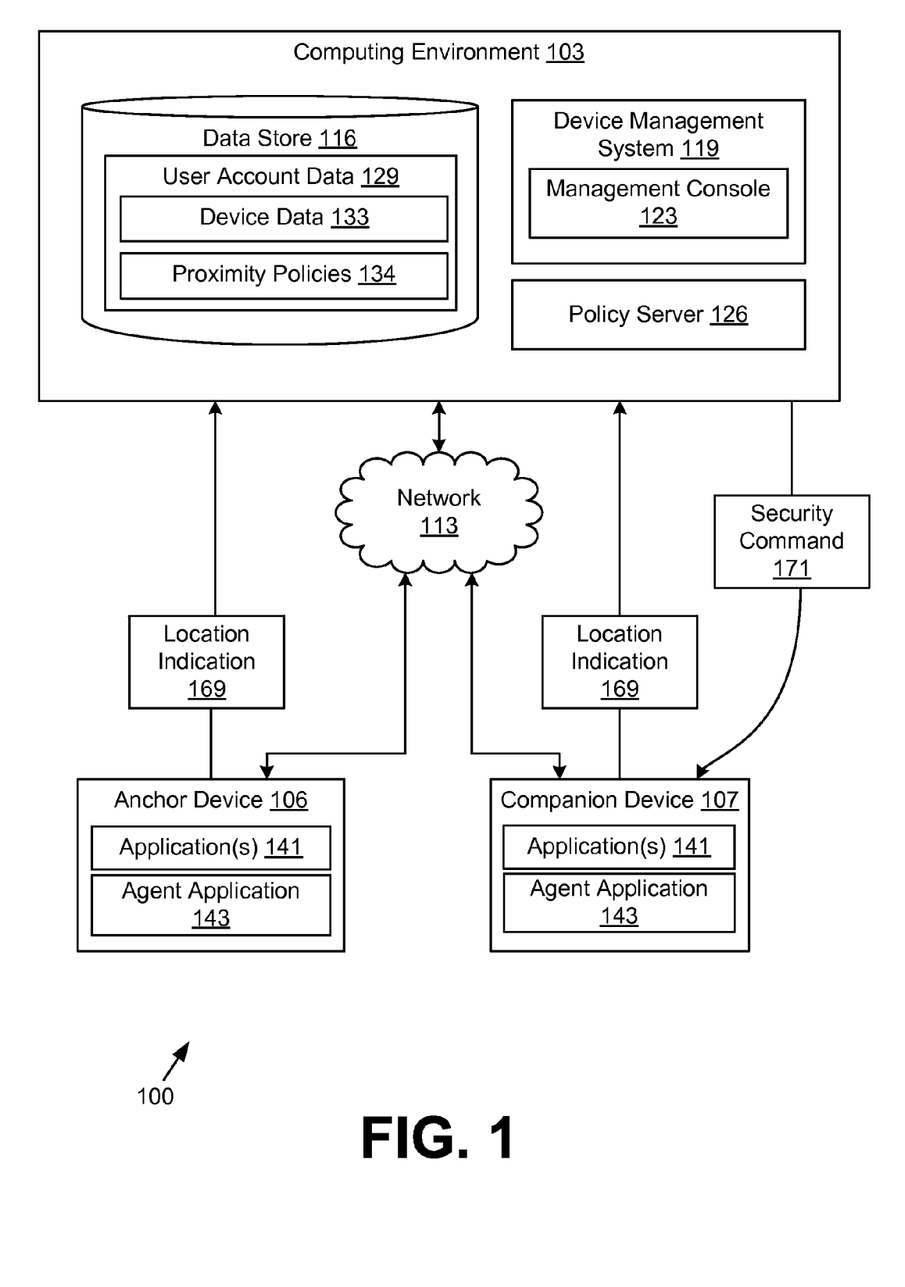
FIG. 1 is a drawing of a networked environment according to various embodiments of the present disclosure.

With reference to FIG. 1, shown is a networked environment 100 according to various embodiments. The networked environment 100 includes a computing environment 103, an anchor device 106, and a companion device 107 which are in data communication with each other through a network 113. The network 113 includes, for example, the Internet, one or more intranets, extranets, wide area networks (WANs), local area networks (LANs), wired networks, wireless networks, other suitable networks, or any combination of two or more such networks. For example, such networks may comprise satellite networks, cable networks, Ethernet networks, telephony networks, and other types of networks.

The computing environment 103 may comprise, for example, a server computer or any other system providing computing capability. Alternatively, the computing environment 103 may employ multiple computing devices that may be arranged, for example, in one or more server banks, computer banks, or other arrangements. Such computing devices may be located in a single installation or may be distributed among many different geographical locations. For example, the computing environment 103 may include multiple computing devices that together form a hosted computing resource, a grid computing resource, and/or any other distributed computing arrangement. In some cases, the computing environment 103 may correspond to an elastic computing resource where the allotted capacity of processing, network, storage, or other computing-related resources may vary over time. The computing environment 103 may also include or correspond to one or more virtualized server instances that are created in order to execute the functionality that is described herein.

Various systems and/or other functionality may be executed in the computing environment 103 according to various embodiments. Also, various data is stored in a data store 116 that is accessible to the computing environment 103. The data store 116 may be representative of a plurality of data stores 116. The data stored in the data store 116, for example, is associated with the operation of the various systems and/or functional entities described below.

A device management system 119 and/or other systems may be executed in the computing environment 103. The device management system 119 may be executed to manage and/or oversee the operation of multiple anchor devices 106 and/or companion devices 107. For example, an employer may operate the device management system 119 to ensure that the anchor devices 106 and/or companion devices 107 of its employees are operating in compliance with various compliance rules. By ensuring that the devices of its employees are operated in compliance with the compliance rules, the employer may control and protect access to various data. As another example, a device manufacturer or software provider may operate the device management system 119 and provide device management capabilities for consumers. For example, a parent may wish to monitor or restrict usage of a device of a child or another user in a household. The device management system 119 may also facilitate access to email, calendar data, contact information, documents, or other data to which an enterprise or other organization may wish to provide access by users via devices such as smartphones, computing devices, a device executing a browser application, mobile application, etc.

In one embodiment, the device management system 119 may provide a management console 123 and/or other components. The management console 123 may facilitate operation and control of the device management system 119. For example, the management console 123 may generate one or more user interfaces that are rendered on a display device (not shown) or accessible using a browser executed by another computing device. Such user interfaces may facilitate entering commands or other information to facilitate configuration of the device management system 119. For example, a user may configure a proximity policy using a user interface generated by the management console 123.

The computing environment 103 may also execute a policy server 126 that facilitates the management of proximity based policies on behalf of users or organizations. The policy server 126 can obtain an indication of a location of various devices that are managed by the device management system 119 as well as determine whether policies are in place with respect to proximity of a particular device relative to another device. The policy server 126 can also transmit commands, or a security command 171, that specify a capability that can be enabled and/or disabled in a companion device 106 in response to detection of the proximity of a companion device 107 to an anchor device 106. In some embodiments, the policy server 126 can be implemented as functionality or logic that is embedded within the device management system 119. In some embodiments, the policy server 126 can also be implemented as a library for which an application programming interface (API) is provided and with which the functionality of the policy server 126 can be invoked by the device management system 119 or any other application or service. Some embodiments may also include the functionality of the policy server 126 being implemented within the anchor device 106 or the companion device 107 by an application executed therein.

The computing environment 103 may also execute other applications to facilitate interactions with an anchor device 106 or companion device 107, such as an application distribution service that distributes applications and/or updates for applications to the devices, a mail server that provides email services and/or functionality, a document storage application that provides remote document storage capability for users, or other applications or services that can be deployed to provide services for its users. Description of such applications or services is not necessary for a complete understanding of embodiments of the disclosure.

The data stored in the data store 116 may include user account data 129, and/or other information. The user account data 129 can include data associated with a user account, such as user profile information as well as information device identifiers 133, proximity policies 134 and other user account data. User profile information can include information about a user's address or location, permissions, and/or privileges with respect to usage of an enterprise device. User profile information can also include access settings such as authentication credentials, delegation settings (e.g., information about other users who may be provided access to the user account data 129 of a particular user), etc.

User account data 129 can also include information about a user account within the computing environment 103. For example, the user account may be associated with an email address or other identifier that is assigned by the computing environment 103. User account data 129 can also include other account settings, such as biographical or demographic information about a user, password reset information, multifactor authentication settings, and other data related to a user account as can be appreciated. User account data 129 can also include other forms of data associated with users of an enterprise's computing resources that are not shown, such as a user's mailbox data, calendar data, contact data, and other user data. For example, mailbox data includes data associated with one or more mailboxes corresponding to a user account of a user.

The user account data 129 may also include information regarding one or more devices that are associated with a user's account, or device data 133. Such information can be stored as device identifiers, which can comprise any information from which a particular computing device can be identified by the proxy server 126 and/or device management system 119. For example, a device identifier may be a unique hardware identifier such as a GUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, or any combination of two or more such hardware identifiers. Accordingly, a particular user account may be associated with multiple anchor devices 106 and/or companion devices 107 for which proximity policies 134 can be defined. Device data 133 can also include, for example, the identification of the particular applications that are installed in the anchor devices 106 and/or companion devices 107, historical data regarding the operation of the anchor devices 106 and/or companion devices 107, and/or other information.

User account data 129 can also include proximity policies 134. A proximity policy 134 can identify at least two devices associated with a particular user account. The proximity policy 134 can identify one of the devices as an anchor device 106 and another of the devices as a companion device 107. The proximity policy 134 can further specify a policy that can be placed upon the anchor device 106 and/or the companion device 107 when the devices are within proximity to one another. The proximity policy 134 can also specify a different policy that can be placed upon the anchor device 106 and/or the companion device 107 when the devices are not within proximity to one another.

The proximity policy 134 can also define a level of proximity necessary in order for an anchor device 106 and companion device 107 identified by a proximity policy 134 to be considered in proximity to one another. For example, in one embodiment, proximity of an anchor device 106 to a companion device 107 may be detected through a respective Bluetooth interface of the anchor device 106 and companion device 107. Accordingly, the proximity policy 134 can specify that a periodic ping or acknowledgement must be exchanged by the devices and such a ping or acknowledgement must be associated with a minimum signal strength. As another example, the proximity policy 134 can specify that in order to be considered in proximity to one another, that a ping or acknowledgement must be exchanged by the companion device 107 and anchor device 106 within a certain threshold time period.

The proximity policy 134 can also specify that the anchor device 106 and companion device 107 be within a certain geographic distance of one another based upon geolocation data that is reported by respective positioning systems (e.g., global positioning system capability). The proximity policy 134 can also specify that the anchor device 106 and companion device 107, in order to be considered in proximity with one another, should be associated with a common internet protocol (IP) address or an IP address within a certain range of one another. The proximity policy 134 can also specify that the anchor device 106 and companion device 107 be connected to the same router, switch or Internet gateway device in order to be considered in proximity with one another.

A proximity policy 134 can also specify actions that should be taken in response to a determination that the anchor device 106 and companion device 107 identified by the proximity policy 134 are not in proximity with one another to a degree specified by the proximity policy 134. For example, a proximity policy 134 can specify that if the devices are in proximity with one another, then a particular application can be used or executed on the companion device 107 but that the particular application cannot be used or executed if the devices are not in proximity. For example, the proximity policy 134 can specify that a browser application, a particular game application, or any other application can only be launched by the companion device 107 when it is determined to be in proximity with the anchor device 106. Otherwise, the particular application can be disabled.

As another example, a proximity policy 134 can specify that if an anchor device 106 and companion device 107 are not in proximity with one another, that a hardware or software capability of the companion device 107 should be disabled. For example, the proximity rule 134 can specify that a network capability or an ability to access a local or wide area network should be disabled. In other words, the proximity rule 134 can specify that Internet access of the companion device 107 should be disabled. A proximity policy 134 can specify that if the anchor device 106 and a companion device 107 are not in proximity, that a security requirement can be imposed upon the user, such as locking the display of the companion device 107 and requiring a password or personal identification number (PIN) to be entered in order for the companion device 107 to be accessed by the user. As another example of security requirement, one or more of various capabilities of the device can be disabled, such as a camera, Bluetooth interface, or other capabilities of the companion device 107.

The anchor device 106 and companion device 107 are representative of multiple client devices that may be coupled to the network 113. The anchor device 106 may comprise, for example, a processor-based system such as a computer system. Such a computer system may be embodied in the form of a desktop computer, a laptop computer, a personal digital assistant, a mobile phone (e.g., a "smartphone"), wearable computing device, a set-top box, a music player, a web pad, a tablet computer system, a game console, an electronic book reader, or any other device with like capability. The anchor device 106 and companion device 107 may include a display that comprises, for example, one or more devices such as liquid crystal display (LCD) displays, gas plasma-based flat panel displays, organic light emitting diode (OLED) displays, LCD projectors or other types of display devices.

The anchor device 106 and companion device 107 may be configured to execute one or more applications 141, an agent application 143, and/or other components. An application 141 may comprise, for example, one or more programs that perform various operations when executed in the anchor device 106 or companion device 107. Such an operation may comprise, for example, storing data, reading data, controlling a component for an anchor device 106 and/or companion device 107, and/or other functionality. An application 141 may perform some operations by initiating functions that are performed by an operating system in the anchor device 106 and/or companion device 107. An application 141 may initiate operating system functions by, for example, performing API calls. An application 141 can include any software that can be installed upon the anchor device 106 and companion device 107, such as a mail application, a browser application, a game, and other types of applications.

The agent application 143 may be executed on the anchor device 106 and companion device 107 to oversee, monitor, and/or manage at least a portion of the resources for the anchor device 106 and companion device 107. The agent application 143 may be executed by the anchor device 106 and companion device 107 automatically upon startup of the respective device. Additionally, the agent application 143 may run as a background process in the anchor device 106 and companion device 107. In other words, the agent application 143 may execute and/or run without user intervention. Additionally, the agent application 143 may communicate with the device management system 119 and policy server 126 in order to facilitate the management of the respective devices by the policy server 126 and/or device management system 119. For example, the agent application 143 can enforce proximity policies 134 that are specified for a particular anchor device 106 and/or companion device 107 on behalf of the policy server 126. In one scenario, the proximity policies 134 can be stored on an anchor device 106 or a companion device 107, which can enforce the proximity policy 134 by issuing a security command 171 through the agent application 143 in response to detecting that the companion device 107 is no longer in proximity to the anchor device 106. In this scenario, a proximity policy 134 can be enforced upon an anchor device 106 or a companion device 107 without requiring a location indication 169 to be provided to a policy server 126 that is executed by the computing environment 103.

Next, an additional description of the operation of the various components of the networked environment 100 is provided. To begin, a proximity policy 134 can be defined that specifies a policy that can be applied to an anchor device 106 and/or companion device 107 when the anchor device 106 and companion device 107 are in proximity to one another. In order to determine whether the anchor device 106 and companion device 107 are in proximity to one another, the policy server 126 can rely upon location indications 169 that are received from the agent application 143 or any other application executed by the anchor device 106 and companion device 107. The agent application 143 can be configured to periodically generate a location indication 169 that corresponds to a location of the anchor device 106 and/or companion device 107, respectively. The location indication 169 can also comprise an indication of whether the anchor device 106 and companion device 107 are in proximity to one another irrespective of the geographic location of the anchor device 106 and companion device 107.

A location indication 169 can comprise geolocation data obtained by the agent application 143 from a positioning system associated with the anchor device 106 and companion device 107, respectively. Accordingly, the policy server 126 can determine whether the anchor device 106 and/or companion device 107 are in proximity to one another based upon whether the geolocation data reflects that the anchor device 106 and/or companion device 107 are within a threshold distance from one another. In some embodiments, the proximity policy 134 associated with the anchor device 106 and/or companion device 107 can also specify such a threshold distance.

A location indication 169 can also comprise a network location of the anchor device 106 and companion device 107, respectively, such as an IP address or IP address subnet, a service set identification (SSID) of a wireless network to which the anchor device 106 and companion device 107 are respectively connected. A network location can also include any other aspects of a network interface or network connection of the anchor device 106 and companion device 107, respectively, to the network 113. Accordingly, the policy server 126 can determine whether the anchor device 106 and/or companion device 107 are in proximity to one another based upon the parameters of the network location of the anchor device 106 and/or companion device 107.

A location indication 169 can also include information about whether a ping or acknowledgement sent through a localized communication interface, such as Bluetooth, has been sent or received to or from the anchor device 106 and companion device 107, respectively. The agent application 143 can be configured to generate a ping that is transmitted from the anchor device 106 to the companion device 107 and vice-versa. Such a ping can be answered by the anchor device 106 and companion device 107 by an acknowledgement. Such a ping and/or acknowledgement can be transmitted by the agent application 143 using a localized communication interface such that they can only be successfully received by the anchor device 106 and/or companion device 107 when the devices are in proximity to one another.

Accordingly, a corresponding location indication 169 generated by the agent application 143 can include an indication of whether a previous ping generated by the agent application 143 executed by one of the anchor device 106 and/or companion device 107 was acknowledged by the other device. The policy server 126 can determine whether the anchor device 106 and/or companion device 107 are in proximity to one another based upon whether a ping was not acknowledged by one or both of the anchor device 106 and/or the companion device 107. The policy server 126 can also make this determination based upon whether a ping or acknowledgement of the anchor device 106 and/or companion device 107 has not been received for a threshold amount of time. The policy server 126 can also make a determination regarding proximity of the anchor device 106 and companion device 107 based upon a signal strength of a received acknowledgement. For example, if a signal strength does not meet a signal strength threshold, the policy server 126 can determine that the anchor device 106 and companion device 107 are not in proximity to one another.

In some embodiments, the agent application 143 executed by the anchor device 106 and/or companion device 107 can generate periodic transmissions that are sent to the other device using a localized communication interface. Accordingly, in the event that a transmission has not been received for a threshold amount of time, the agent application 143 can generate a location indication 169 that alerts the policy server 126 that the device from which the transmission was expected has not been received.

In response to determining that an anchor device 106 and companion device 107 are in proximity or not in proximity to one another, the policy server 126 can issue a security command 171 that instructs the agent application 143 to apply a policy that is specified by the proximity policy 134 associated with the anchor device 106 and companion device 107. For example, if the policy server 126 determines that the anchor device 106 and companion device 107 are within proximity to one another based upon location indicators 169 received from the anchor device 106 and companion device 107, the policy server 126 can issue a security command 171 to the companion device 107 with respect a functionality that is to be either enabled or disabled within the companion device 107 by the agent application 143. For example, the security command 171 can instruct the agent application 143 of the companion device 107 to enable access to a particular application if the anchor device 106 and companion device 107 are in proximity to one another.

Conversely, if the policy server 126 determines, based upon the location indicators 169, that the anchor device 106 and companion device 107 are no longer in proximity to one another, the policy server 126 can issue a security command 171 to the agent application 143 as specified by a respective proximity policy 143. Such a security command 171 can include a restriction that the agent application 143 can enforce upon the companion device 107 or a security requirement enforced upon the companion device 107 or the user of the companion device 107. In other words, the security command 171 can restrict a capability of the companion device 107 as a result of a lack or proximity to the anchor device 106. For example, the security command 171 can instruct the agent application 143 to disable a particular application installed on the companion device 107. The security command 171 can also instruct the agent application 143 to lock a display of the companion device 107 or impose any other type of security measure. The security command 171 can also restrict access by a user of the companion device 107 to content that is stored on the companion device 107, such as mail, documents, media or other content. Additionally, the security command 171 can restrict the ability of companion device 107 to communicate with other devices through the network 113.

Should proximity to the anchor device 106 be reestablished, the policy server 126 can issue another security command 171 that removes a restriction or enables a particular disabled functionality of the companion device 107. Additionally, in some embodiments, the agent application 143 executed by the anchor device 106 can be configured to issue a security command 171 directly to the companion device 107 or instruct the policy server 126 to issue a security command 171 that enables or disables certain restrictions or functionality irrespective of proximity of the anchor device 106 to the companion device 107. In other words, the anchor device 106, in some embodiments, can override the policy server 126 with respect to proximity policies 134.

Figure 2:
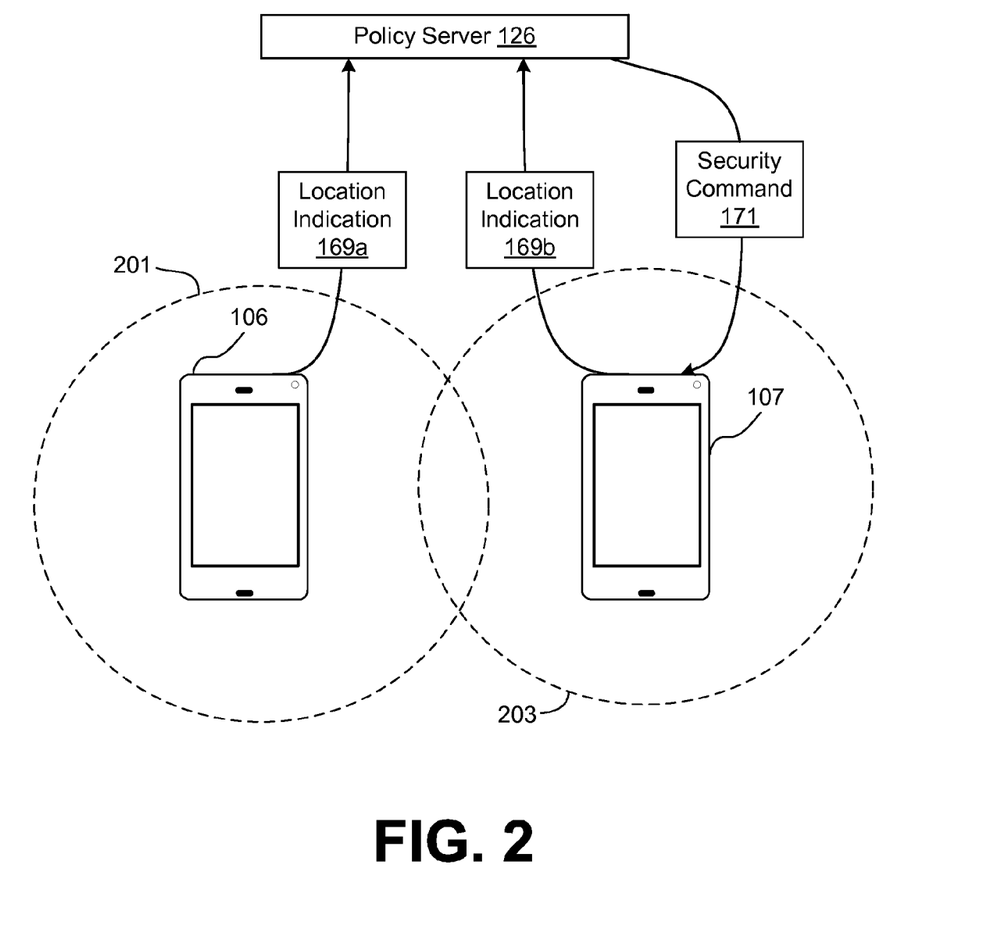
FIG. 2 is a diagram illustrating an example scenario according to various embodiments of the present disclosure.

Referring next to FIG. 2, shown is an example of an anchor device 106 and companion device 107 that are in proximity to one another. Such proximity is indicated visually in FIG. 2 by the overlapping circles 201 and 203. In the scenario illustrated in FIG. 2, the policy server 126 can determine that the anchor device 106 and companion device 107 are in proximity to one another based upon location indicators 169a and 169b received from the anchor device 106 and companion device 107. In the example shown in FIG. 2, the policy server 126 can determine that the anchor device 106 and companion device 107 are in proximity with one another and also determine whether a proximity policy 134 is associated with the anchor device 106 and companion device 107. If a proximity policy 134 is associated with the anchor device 106 and companion device 107, the policy server 126 can identify an action associated with the proximity policy 134 and issue a security command 171 to the companion device 107 that enables or disables a particular restriction or capability of the companion device 107.

Figure 3A:
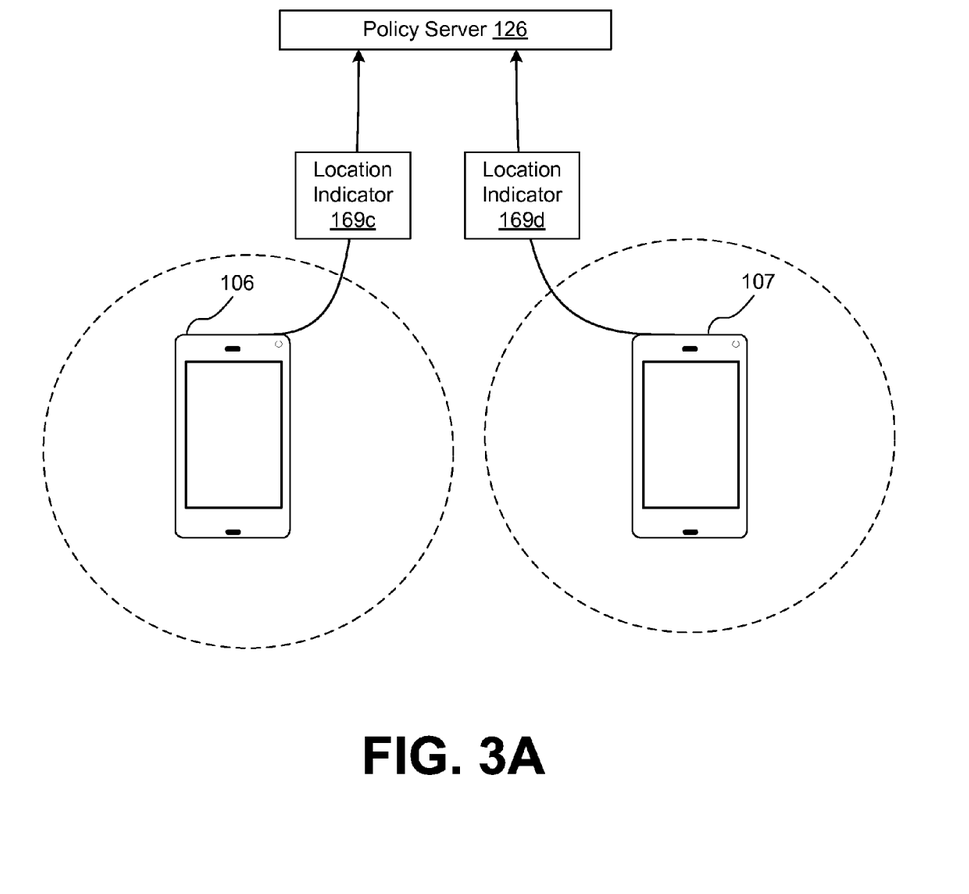
FIGS. 3A-3D are diagrams illustrating example scenarios according to various embodiments of the present disclosure.

Continuing the example of FIG. 2, reference is now made to FIG. 3A, which illustrates a scenario in which the anchor device 106 and companion device 107 are no longer within the prescribed proximity as defined by the proximity policy 134. As noted above, the policy server 126 can determine whether the anchor device 106 and companion device 107 are in proximity based upon location indicators 169c and 169d that are received from the anchor device 106 and companion device 107.

Figure 3B:
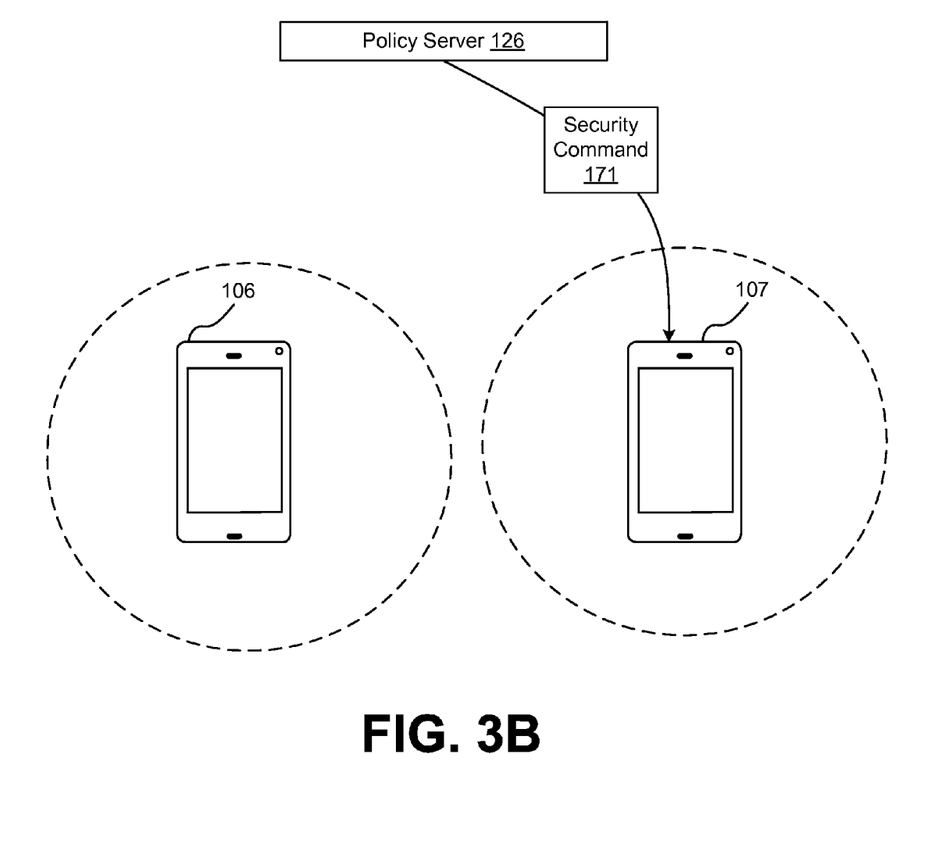

Therefore, referring to FIG. 3B, because the anchor device 106 and companion device 107 are no longer within proximity to one another as determined by the policy server 126, the policy server 126 can issue a security command 171 to the companion device 107 that comprises an action specified by a corresponding proximity policy 134. The proximity policy 134 can specify a capability of the companion device 107 that should be restricted or disabled now that the companion device 107 is no longer in proximity to the anchor device. The proximity policy 134 can also identify content stored on the companion device 107 and/or any other device that should be unavailable to the companion device 107 as a result of the lack of proximity to the anchor device 106. Accordingly, in the example of FIG. 3B, the policy server 126 can issue a security command 171 to the agent application 143 executed by the companion device 107, which can restrict or remove a capability of the companion device 107 on behalf of the policy server 126.

Figure 3C:
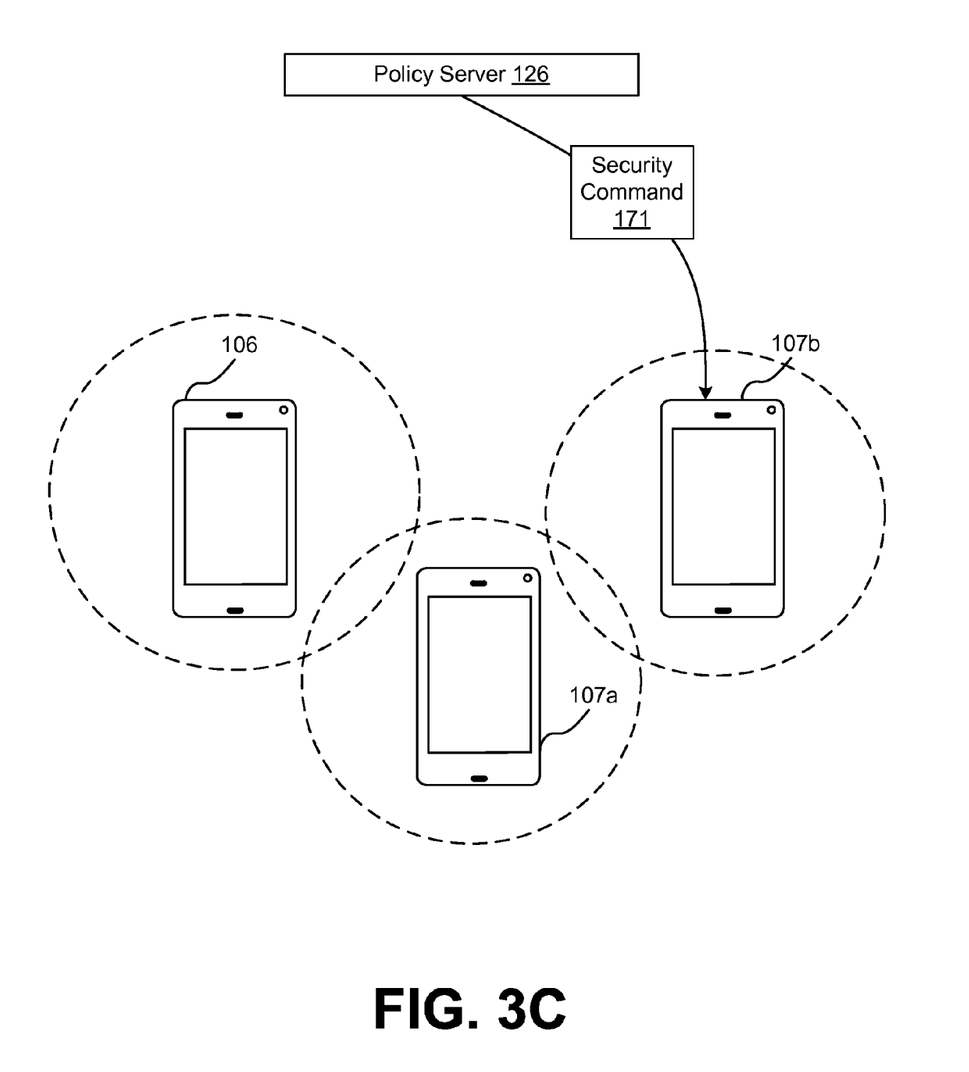

FIG. 3C illustrates an alternative scenario in which the anchor device 106 can be associated with multiple companion devices 107a and 107b. In the depicted scenario, because the anchor device 106 and companion device 107b are no longer within proximity to one another as determined by the policy server 126, the policy server 126 can issue a security command 171 to the companion device 107b that comprises an action specified by a corresponding proximity policy 134. However, because the anchor device 106 and companion device 107a are in proximity with one another, the policy server 126 can avoid issuing a security command 171 to the companion device 107b. As in the previous example, the proximity policy 134 can specify a capability of the companion device 107a, 107b that should be restricted or disabled should either companion device 107a or 107b move to a location that is no longer in proximity to the anchor device 106. Accordingly, in the example of FIG. 3C, the policy server 126 can issue a security command 171 to the agent application 143 executed by the companion device 107b, which can restrict or remove a capability of the companion device 107b on behalf of the policy server 126.

Figure 3D:
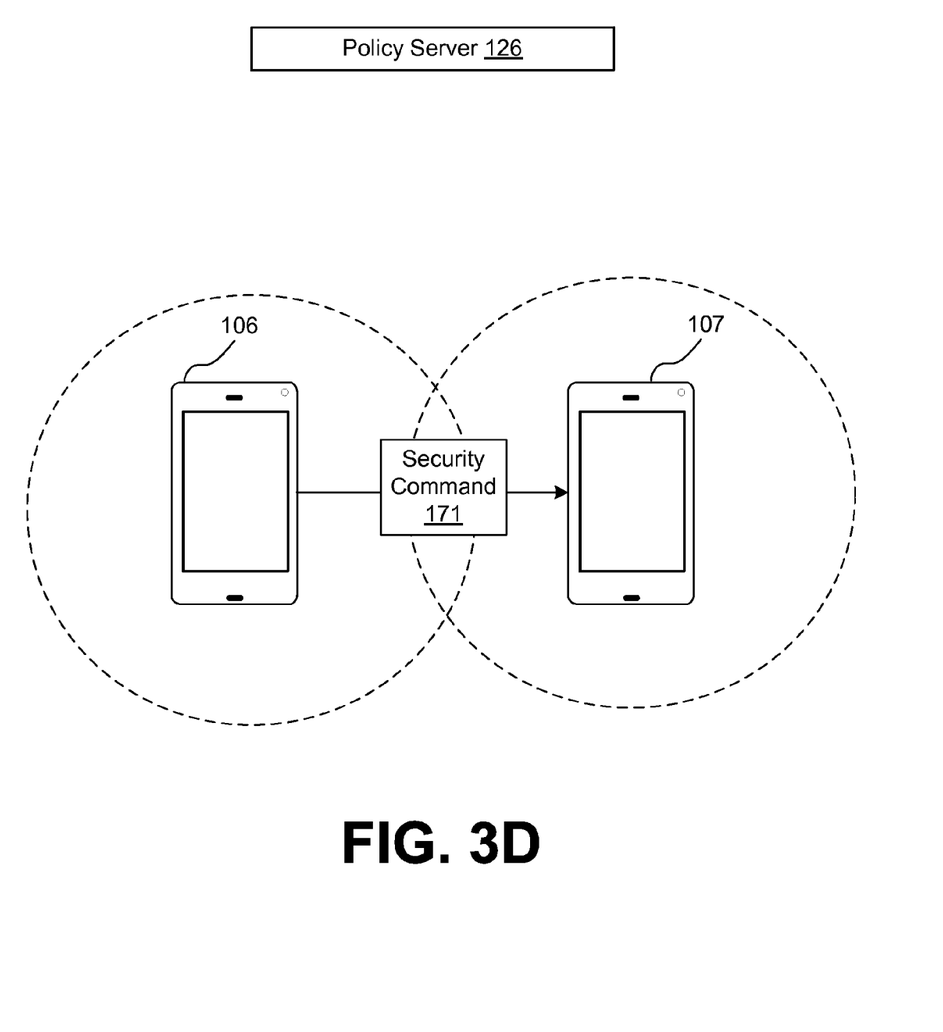

FIG. 3D presents an alternative scenario in which the anchor device 106 and companion device 107 are in proximity with one another. In the example of FIG. 3D, although the policy server 126 has not determined that the anchor device 106 and companion device 107 are not out of proximity with respect to one another, a user, using the anchor device 106, can cause a security command 171 to be generated and transmitted to the agent application 143 executed by the companion device 107. In this sense, the anchor device 106 can override a proximity policy 134 that is defined for a particular anchor device 106 and companion device 107.

Figure 4:
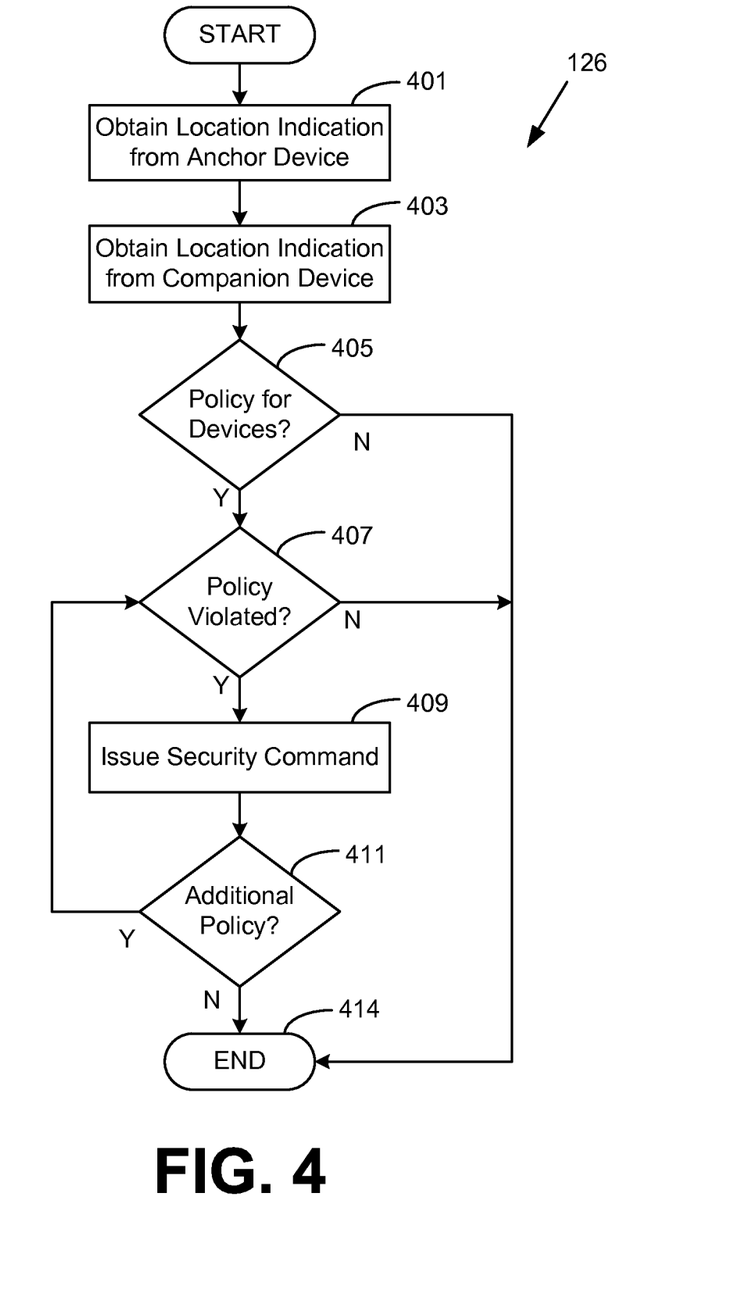
FIGS. 4-6 are flowcharts illustrating examples of functionality implemented as portions of the policy server and agent application according to various embodiments of the present disclosure.

Referring next to FIG. 4, shown is a flowchart that provides one example of the operation of a portion of the policy server 126 according to various embodiments. It is understood that the flowchart of FIG. 4 provides merely an example of the many different types of functional arrangements that may be employed to implement the operation of the portion of the policy server 126 as described herein. As an alternative, the flowchart of FIG. 4 may be viewed as depicting an example of elements of a method implemented in the computing environment 103 (FIG. 1) according to one or more embodiments.

Beginning with box 401, the policy server 126 can obtain a location indication 169 from an anchor device 106. A location indication 169 can include geolocation data with respect to the anchor device 106, a network location of the anchor device 106 and/or an indication of proximity to the companion device 107 based upon data transmissions obtained from the companion device 107 using a localized communication interface. At box 403, the policy server 126 can obtain a location indication 169 from the companion device 107. Next, at box 405, the policy server 126 can determine whether a proximity policy 134 exists that identifies the anchor device 106 and companion device 107.

If a proximity policy 134 that is associated with the anchor device 106 and companion device 107 is identified, then at box 407 the policy server 126 determines whether the policy is violated. Otherwise, the process can proceed to completion at box 414. A proximity policy 134 can be violated should the companion device 107 no longer be in proximity to the anchor device 106 as defined by the proximity policy 134 and as determined by the proximity server 126. If the proximity policy 134 is violated, then at box 409, the policy server 126 can issue a security command 171 to the companion device 107. The security command 171 can comprise a command that instructs the companion device 107 and/or the agent application 143 to modify and/or restrict a functionality of the companion device 107. Otherwise, if the proximity policy 134 is not violated, then the process can proceed to completion at box 414. At box 411, the policy server 126 can determine whether an additional proximity policy 134 is associated with the anchor device 106 and the companion device 107. If so, then the process can proceed to box 407. Otherwise, the process can proceed to completion at box 414.

Figure 5:
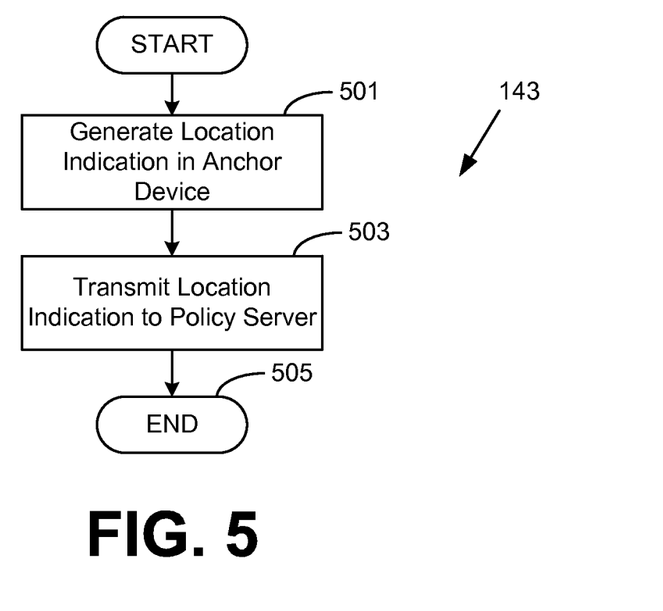

Referring next to FIG. 5, shown is a flowchart that provides one example of the operation of a portion of the agent application 143 executed by the anchor device 106 according to various embodiments. It is understood that the flowchart of FIG. 5 provides merely an example of the many different types of functional arrangements that may be employed to implement the operation of the portion of the anchor device 106 as described herein. As an alternative, the flowchart of FIG. 5 may be viewed as depicting an example of elements of a method implemented in the anchor device 106 (FIG. 1) according to one or more embodiments.

First, at box 501, the agent application 143 can generate a location indication 169 indicating a location of the anchor device 106 and/or the proximity of the anchor device 106 to a companion device 107. At box 503, the agent application 143 can transmit the location indication 169 to the policy server 126.

Figure 6:
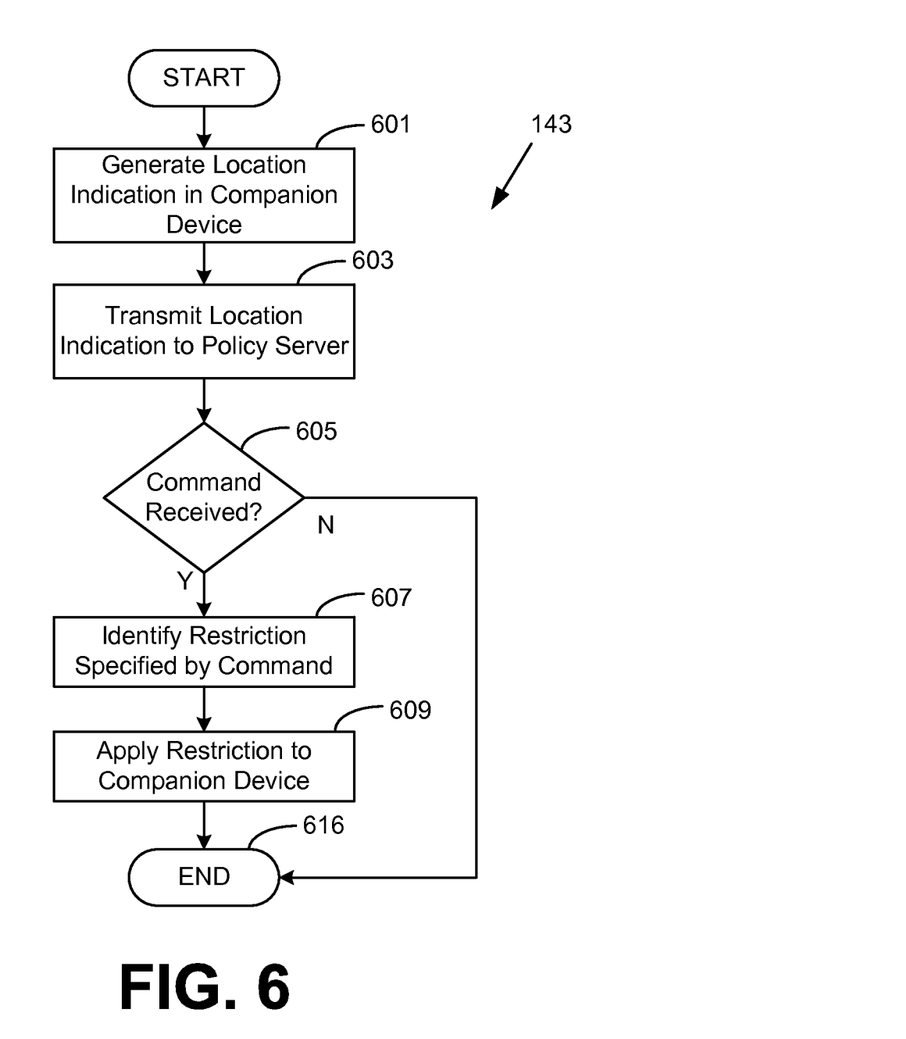

Referring next to FIG. 6, shown is a flowchart that provides one example of the operation of a portion of the agent application 143 executed by the companion device 107 according to various embodiments. It is understood that the flowchart of FIG. 6 provides merely an example of the many different types of functional arrangements that may be employed to implement the operation of the portion of the companion device 107 as described herein. As an alternative, the flowchart of FIG. 6 may be viewed as depicting an example of elements of a method implemented in the companion device 107 (FIG. 1) according to one or more embodiments.

First, at box 601, the agent application 143 can generate a location indication 169 indicating a location of the companion device 106 and/or the proximity of the companion device 107 to an anchor device 106. At box 603, the agent application 143 can transmit the location indication 169 to the policy server 126. At box 605, the agent application 143 can determine whether a security command 171 is received from the policy server 126. If so, then at box 607, the agent application 143 can identify a particular restriction identified by the security command 171. At box 609, the agent application 143 can apply the restriction identified by the security command to the companion device 107. The restriction specified by the security command 171 can alter or disable a particular capability of the companion device 107.

The anchor device 106, companion device 107 or devices comprising a computing environment can include at least one processor circuit, for example, having a processor and at least one memory device, both of which are coupled to a local interface, respectively. Such a device may comprise, for example, at least one computer, a mobile device, smartphone, computing device or like device. The local interface may comprise, for example, a data bus with an accompanying address/control bus or other bus structure as can be appreciated.

Stored in the memory device are both data and several components that are executable by the processor. In particular, stored in the one or more memory device and executable by the processor of such a device can be the policy server 126, agent application 143 and potentially other applications. Also stored in the memory may be a data store 113 and other data.

A number of software components are stored in the memory and are executable by a processor. In this respect, the term "executable" means a program file that is in a form that can ultimately be run by the processor. Examples of executable programs may be, for example, a compiled program that can be translated into machine code in a format that can be loaded into a random access portion of one or more of the memory devices and run by the processor, code that may be expressed in a format such as object code that is capable of being loaded into a random access portion of the one or more memory devices and executed by the processor, or code that may be interpreted by another executable program to generate instructions in a random access portion of the memory devices to be executed by the processor, etc. An executable program may be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor may represent multiple processors and/or multiple processor cores, and the one or more memory devices may represent multiple memories that operate in parallel processing circuits, respectively. Memory devices can also represent a combination of various types of storage devices, such as RAM, mass storage devices, flash memory, hard disk storage, etc. In such a case, a local interface may be an appropriate network that facilitates communication between any two of the multiple processors, between any processor and any of the memory devices, etc. A local interface may comprise additional systems designed to coordinate this communication, including, for example, performing load balancing. The processor may be of electrical or of some other available construction.

The authenticator device 106 and/or computing device 107 may include a display upon which a user interface generated by the file storage application 216 or another application can be rendered. The computing device 106 and/or computing device 107 may also include one or more input/output devices that may include, for example, a capacitive touchscreen or other type of touch input device, fingerprint reader, keyboard, etc.

Although the file storage application 216 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show an example of the functionality and operation of an implementation of portions of components described herein. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts show a specific order of execution, it is understood that the order of execution may differ from that which is depicted. For example, the order of execution of two or more blocks may be scrambled relative to the order shown. Also, two or more blocks shown in succession may be executed concurrently or with partial concurrence. Further, in some embodiments, one or more of the blocks shown in the drawings may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, solid-state drives, flash memory, etc. Further, any logic or application described herein may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices. Additionally, it is understood that terms such as "application," "service," "system," "engine," "module," and so on may be interchangeable and are not intended to be limiting.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A non-transitory computer-readable medium embodying program code being configured to allow remote application of a policy that controls the type of authentication to be used between devices under a device management system, the program code being executable in a computing device, the program code being configured to cause the computing device to at least:
   obtain, remotely at a policy server, a first location indication associated with an anchor device, the first location indication being at least one of a geographic location or a network location of the anchor device;
   obtain, remotely at the policy server, a second location indication associated with a companion device, the second location indication being at least one of a geographic location or a network location of the companion device;
   identify, on the policy server, a policy stored in a data store that associates the anchor device and the companion device, the policy specifying a security requirement that when the first location and the second location are within a proximity, the companion device can be accessed using a reduced authentication, and when the first location and the second location are not within the proximity, the companion device cannot be accessed using the reduced authentication;
   determine whether the policy is violated based at least in part upon the first location indication and the second location indication; and
   issue a command to the companion device from the policy server in response to a determination that the policy is violated based at least in part upon the first location indication and the second location indication, the command requiring that the companion device be accessed in accordance with the security requirement, wherein the policy server operates as part of the device management system to vary and control the types of authorization required between a plurality of anchor devices and companion devices.

2. The non-transitory computer-readable medium of claim 1, wherein the policy further specifies a restriction on a capability with respect to launching a particular application by the companion device.

3. The non-transitory computer-readable medium of claim 2, wherein the particular application comprises a browser application.

4. The non-transitory computer-readable medium of claim 1, wherein the first location indication or the second location indication comprises at least one of: location data obtained by a positioning system or a network address.

5. The non-transitory computer-readable medium of claim 1, wherein the policy is determined to be violated based at least in part upon the difference between the first location indication and the second location indication when the second location is determined to be more than a threshold distance from the first location.

6. The non-transitory computer-readable medium of claim 1, wherein the first location or the second location comprise at least one communication between the anchor device and the companion device using a first localized communication interface associated with the anchor device and a second localized communication interface associated with the companion device.

7. The non-transitory computer-readable medium of claim 6, wherein the first localized communication interface and the second localized communication interface comprise at least one of a Bluetooth interface, a near-field communication (NFC) interface or a radio-frequency identification (RFID) interface.

8. The non-transitory computer-readable medium of claim 1, wherein the policy further specifies a restriction on a capability comprising restricting access to content stored on the companion device.

9. The non-transitory computer-readable medium of claim 1, wherein the command comprises a command to lock a display device associated with the companion device.

10. A method for remotely applying a policy that controls the type of authentication to be used between devices under a device management system comprising:
   establishing, at a remote policy server, a proximity policy for selectively enforcing a restriction upon at least one of an anchor device or a companion device;
   transmitting a first location indicator to the policy server using a network, the first location indicator indicating a location of the companion device relative to the anchor device; and
   obtaining a command from the policy server or in response to the first location indicator, the command being related to a proximity of the companion device to an anchor device, the proximity being determined based upon the first location indicator, the command further specifying the restriction enforced upon at least one of the anchor device or the companion device, wherein
   the restriction indicates that when the first location and the second location are within the proximity, the companion device can be accessed using a reduced authentication, and when the first location and the second location are not within the proximity, the companion device cannot be accessed using the reduced authentication, wherein the policy server operates as part of the device management system to vary and control the types of authorization required between a plurality of anchor devices and companion devices.

11. The method of claim 10, wherein the command specifies a restriction with respect to executing a particular application installed on the companion device.

12. The method of claim 11, wherein the restriction disables launching of the particular application.

13. The method of claim 10, wherein the command enables a functionality of the companion device in response to the first location indicator.

14. The method of claim 10, wherein the command disables a networking capability of the companion device.

15. The method of claim 10, wherein the command is obtained further in response to a second location indicator associated with the anchor device.

16. A method for remotely applying a policy that controls the type of authentication to be used between devices under a device management system, comprising:
   obtaining, remotely in a policy server, a first location indicator corresponding to a location of a first computing device relative to a second computing device;
   determining, in the policy server, whether a policy is associated with the first computing device and the second computing device, the policy specifying a security requirement associated with the first computing device based upon a proximity of the first computing device to the second computing device, the security requirement indicating that when the first location and the second location are within the proximity, the first computing device can be accessed using a reduced authentication, and when the first location and the second location are not within the proximity, the first computing device cannot be accessed using the reduced authentication;
   determining, in the policy server, whether the first computing device complies with the policy based upon the proximity; and
   issuing, remotely from the policy server, a command specified by the policy, wherein the policy server operates as part of the device management system to vary and control the types of authorization required between a plurality of first computing devices and second computing devices.

17. The method of claim 16, wherein the first location indicator comprises an indication that the first computing device is outside of a communication range of a localized communication interface of the first computing device.

18. The method of claim 16, wherein the command disables a communication interface associated with the first computing device.

19. The method of claim 16, wherein the command disables a particular application installed on the first computing device.

20. A system for remotely changing the authentication types required between devices under a device management system based on proximity, comprising:
   a first computing device;
   a second computing device; and
   a policy server that is remote to the first computing device and remote to the second computing device, wherein:
      the policy server stores a profile with a security restriction, the security restriction indicating that when the second computing device is not within the proximity to the first computing device, the first computing device must be accessed using additional authentication;
      the policy server issues a command to the first computing device requiring the additional authentication when the first computing device is not within the proximity of the second computing device; and
      the policy server varies and controls the types of authorization required between a plurality of first computing devices and second computing devices.

21. A system for changing authentication types based on proximity, comprising:
   a first computing device; and
   a second computing device, wherein:
      the first computing device receives a profile with a security restriction from a remote policy server, the remote policy server storing a plurality of different profiles for controlling authentication types between devices under a device management system,
      the first computing device determines a proximity between the first computing device and the second computing device;
      the first computing device accesses the profile with the security restriction, the security restriction indicating that when the second computing device is within the proximity to the first computing device, the first computing device can be accessed using a reduced authentication; and
      the first computing device detects the proximity with the second computing device and allows access using the reduced authentication.

* * * * *